March 11, 1952  J. A. TOY ET AL  2,589,165
CHAIN SAW GRINDER
Filed Jan. 16, 1950  2 SHEETS—SHEET 1
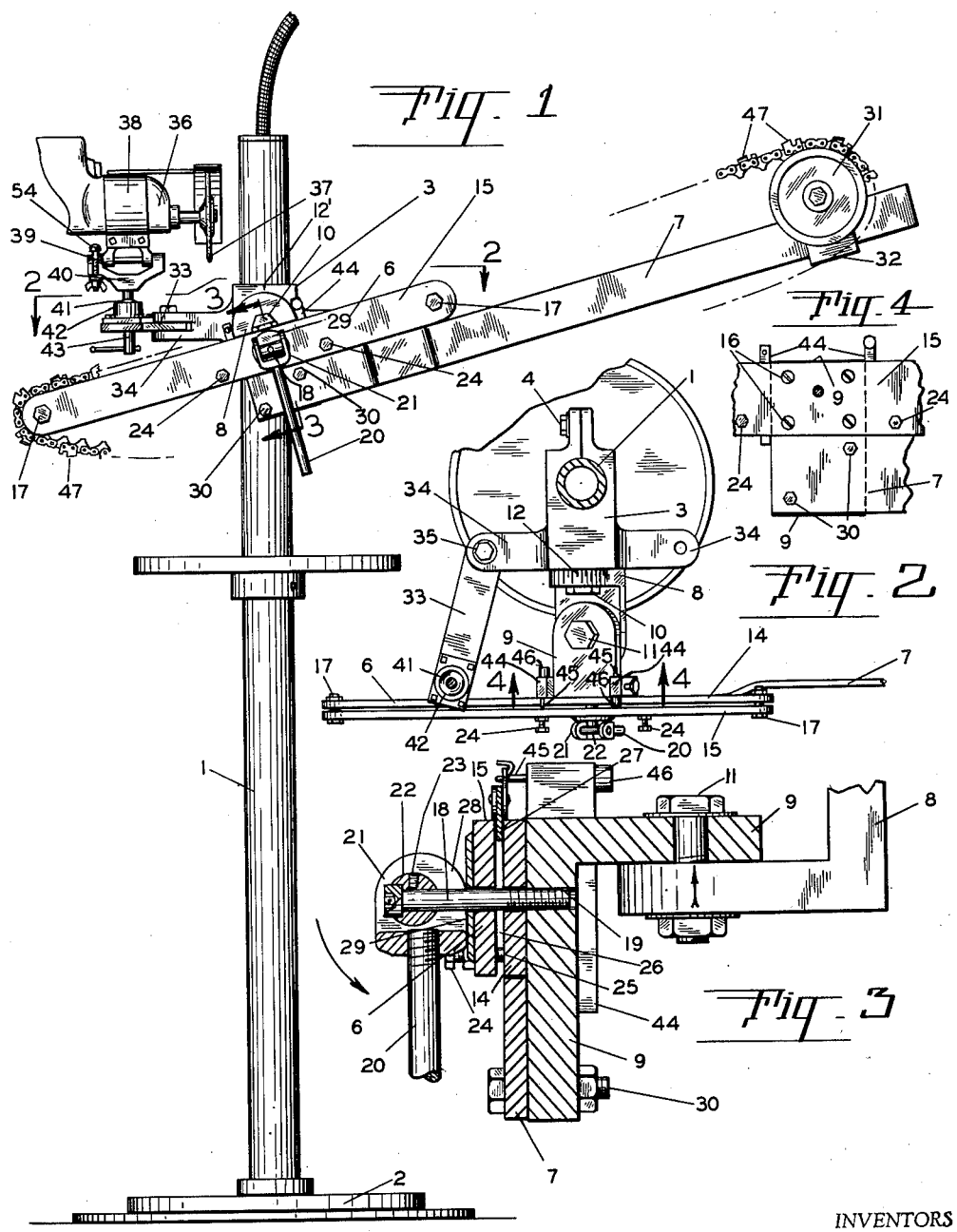
INVENTORS
JOHN A. TOY
PAUL RETHORET
BY
ATTORNEY March 11, 1952  J. A. TOY ET AL  2,589,165
CHAIN SAW GRINDER
Filed Jan. 16, 1950  2 SHEETS—SHEET 2
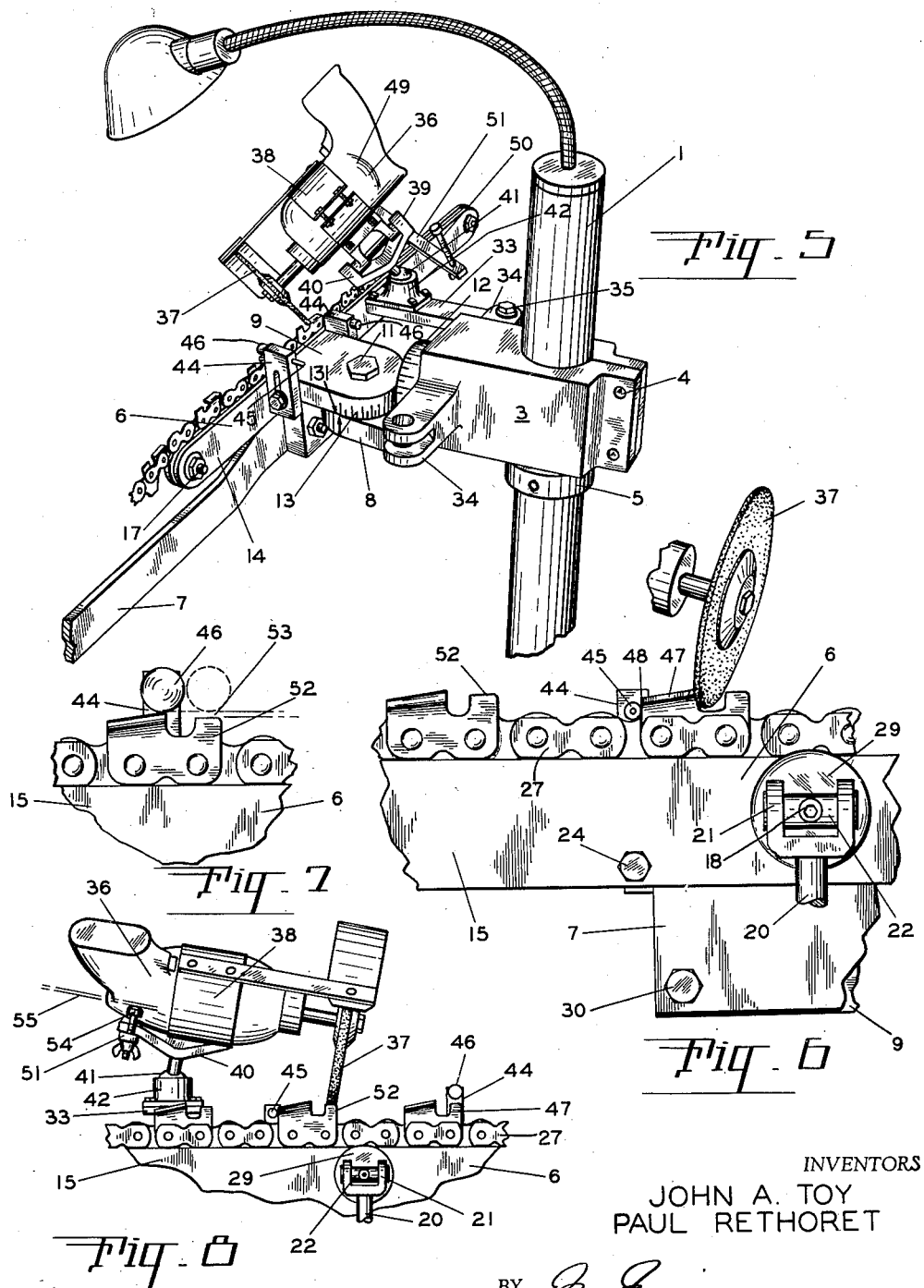
INVENTORS
JOHN A. TOY
PAUL RETHORET
BY
ATTORNEY Patented Mar. 11, 1952

2,589,165

UNITED STATES PATENT OFFICE 2,589,165

CHAIN SAW GRINDER

John Albert Toy and Paul Rethoret,
Eugene, Oreg.

Application January 16, 1950, Serial No. 138,756

4 Claims. (Cl. 76—40)

1

This invention relates to chain saw grinders and is particularly adapted for grinding and reconditioning chain saws including standard cutter chains having teeth in the plane of the link plates or blades or those having turned over or rounded cutting edges which are undercut or beveled or require hollow grinding or sharpening on the underside or inside and bight portions thereof, such as those of the "Oregon" or chisel bit type or the like, which may have rider teeth spaced from the cutting teeth in the length of the teeth links which also require accurate grinding to provide accurate riding clearance to insure a smooth operating saw, and are adapted to be gauged and set so that there will be uniform clearance and grinding of the teeth throughout the length of the chain saw.

The primary object of this invention is the building of a grinding machine for precision grinding or reconditioning of chain saws, insuring a uniformly ground tooth throughout the length of the chain, greatly increasing the cutting efficiency and smoothness of operation of chain saws.

With our new grinding machine a predetermined grinding angle is accurately maintained in conditioning the teeth, together with a uniform rider clearance throughout the length of the chain saw.

Another object of this invention is the provision of a grinding machine that can be operated without drawing the temper from the teeth of the saw, thereby increasing its life and effective cutting efficiency.

A still further object of the invention is the provision of a grinder that will hollow grind the teeth, which also increases the cutting efficiency and smoothness of operation of the saw.

And a further object of the invention is the provision of special stops associated with the grinding operation of the machine for accurately locating the teeth relative to the grinder wheel on each setting, insuring equal length of teeth throughout the length of the chain, and at the same time these stops are used to accurately set the grinding wheel relative to the rider teeth so that there will be uniform rider clearance through the length of the chain.

These and other incidental objects will be apparent in the drawings, specification and claims.

Referring to the drawings:

Figure 1 is a front view of our new and improved saw grinding machine.

Figure 2 is a detail fragmentary plan sectional view taken on line 2—2 of Figure 1.

2

Figure 3 is a detailed fragmentary sectional view taken on line 3—3 of Figure 1, illustrating the method of clamping the saw within the special saw clamp structure.

Figure 4 is a detail fragmentary sectional view taken on line 4—4 of Figure 2 illustrating how the basic part of the saw clamp is secured to the universal holding brackets.

Figure 5 is a fragmentary detail rear perspective view of the grinder illustrating the same in position for grinding one of the teeth of the saw.

Figure 6 is a detail fragmentary front view of the saw holding clamp illustrating the grinding wheel conditioning one of the teeth of the saw.

Figure 7 is a fragmentary detail of part of the holding clamp, saw and gauge for gauging the rider clearance.

Figure 8 is a fragmentary detail of the clamp, saw and grinding unit grinding the rider teeth to the proper rider clearance.

Referring more specifically to the drawings:

Our new and improved chain saw grinder consists of a pedestal 1 mounted upon the base 2, having a bracket 3 adjustably mounted thereon. The bracket 3 is adjustable up and down on the pedestal 1 and is clamped thereto by the clamping bolts 4. This bracket may be further supported by the locking collar 5, as best illustrated in Figure 5.

The saw clamp assembly 6 and the elongated saw holding bracket or bar 7 are mounted to the bracket 3 by way of the universal right-angular or L-shaped brackets 8 and 9. The universal bracket 8 is secured through its vertical leg to the bracket 3 by way of the cap screw 10 forming a horizontal pivot axis for angular adjustment thereof, while the universal bracket 9 is pivotally mounted to the universal bracket 8 through its horizontal leg by the cap screw 11 forming a vertical pivot axis. The horizontal angle of the saw clamp 6 is determined by the position of the universal bracket 8 relative to the bracket 3, the angle being indicated by the angle scale or gauge marks 12 at center line or arrow 12'. The radial angle of the clamp 6 is determined by the position of the universal bracket 9 in relation to the universal bracket 8 and is indicated by the angle scale or gauge marks 13 at indicating line or arrow 13'. When the grinder is in operation the cap screws 10 and 11 are tightly cinched up holding the universal brackets in a predetermined fixed position.

The brackets 8 and 9 are particularly adapted for adjusting the angle of the chain saw in relation to the grinder in the preparing of the teeth for different kinds of wood to be cut and in revolving the chain around the supporting brackets.

The saw clamp 6 consists of two flat bars 14 and 15. The bar 14 is secured to the universal bracket 9 by the cap screws 16, while the bar 15 is held to the bar 14 by the bolts 17, which also provide means to space the said bars a predetermined distance apart, best illustrated in Figures 2, 3 and 4. The clamping bolt 18, referring to Figure 3, passes through the bars 14 and 15 midway their length and is threaded into the universal bracket 9 at 19. This bolt is operated by the handle 20, which is fixedly secured to the eccentric head 21.

A cross pin 22 is rotatably mounted within the eccentric head or cam 21 and is adapted to receive the head of the clamping bolt or Allen screw 18, which may be locked in a fixed position by the set screw 23. Adjustable set screws 24 are threaded through the bar 15 and adapted to bear against the bar 14 at 25, accurately determining the width of the space 26 between the said bars at their lower edges at the bottom of saw clamp assembly 6. The driver links 27 of the chain enter the space 26 at the upper edges of the bars or top of saw clamp assembly 6 and are tightly clamped therebetween when the grinding operation is taking place. A coarse adjustment of the bolt 18 is made by threading it in or out of the bracket 9 by revolving the handle 20 and the eccentric head or cam 21 with the said bolt. The universal mounting comprised by brackets 8 and 9, and the clamping action of the eccentric head or cam 21 also permits the clamp 6 and parallel bracket or bar 7 and the saw chain to be revolved around the bracket and clamp axes 10, 11 and 18, to set the chain saw at the proper angular, horizontal or inclined position for most effective action of the grinding wheel on or grinding and sharpening of the teeth.

After this adjustment has been made, the handle 20 is brought down to the position illustrated in the drawings, causing the portion of greatest eccentricity 28 of the eccentric head to bear against the pressure plate 29 forcing the upper edges of the bars 14 and 15 together gripping the links 27 of the chain. By simply revolving or releasing the eccentric head by pulling outward on the handle 20 the saw can be relocated and quickly clamped in place by pushing the handle towards the clamp.

The saw holding bracket or bar 7 is also bolted to the bracket 9 by the bolts 30 and has an idler wheel 31 adjustably mounted to slide lengthwise thereon by the bearing bracket 32 so that the same can be adjusted for various lengths of saws being reconditioned.

We have provided an adjustable bracket or arm 33, which is pivotally mounted to either of the oppositely extending fixed arms 34 at 35, referring to Figures 1, 2 and 5, the arms 34 being disposed at opposite sides of and forming part of the bracket 3. The object of the bracket 33 is to support the grinding motor 36, together with its grinding wheel 37. The motor 36 is held by the clamp 38, which is pivotally mounted at 39 to the supporting bracket 40 shown as forked or U-shaped with a horizontal pivot between the arms thereof, on which clamp 38 is mounted. The bracket 40 has a central depending shank provided with a ball 41 forming part thereof and adapted to work within the socket 42 forming a universal or ball and socket joint mounting for the bracket 40, motor 36 and grinding wheel 37 thereof. This ball may be locked within the socket by the adjusting set screw 43, thereby holding the motor 36 at any desired angle relative to the bracket 33 and to the saw being sharpened.

Adjustably secured to the oppositely disposed sides of the bracket 9 are vertically adjustable stop holders 44. These stop holders have oppositely disposed horizontal pins 45 slidably mounted therein. These pins have heads 46 on one of their ends which are for the purpose of positioning the pins as well as providing means of gauging the rider clearance of the rider teeth, which will be described later.

Referring to Figure 6, the teeth 47 are positioned relative to the clamp 6 by having their rear ends 48 engage the one or left hand pin 45. The grinding wheel 37 and the motor 36 is then adjusted to the desired angle that the tooth 47 is to be ground by way of the bracket 33, the ball and socket adjustment relative to the bracket 40 and the position of the universal brackets 8 and 9, all of these adjustments working together for positioning the grinder for grinding the proper angle to the teeth 47.

The motor and grinder assembly are pivotally mounted to the bracket 40 as illustrated at 39, and when not contacting the saw, is swung back so that the side of the motor at 49 rests upon the adjustable stop pin or screw 50 associated with the supporting bar 51, which is fixedly secured to the bracket 40. When the tooth is to be ground the operator grasps the handle of the motor pivoting it to the position illustrated in Figures 5, 6 and 8, toward or to rest upon a second adjustable stop pin or screw 54, also associated with or mounted on the supporting bar 51, but at its forward end, spaced and remote from the stop 50, which is mounted at the rear end of said bar 51, with wheel 37 in position for grinding the tooth. When the tooth has been ground the lever or handle 20 is raised to turn eccentric head 21 or bolt 18 may be turned to permit the bar or jaw 15 to move or spring away from bar or jaw 14 to its normal spaced relation thereto thereby loosening or releasing the clamp 6 from the clamped tooth to cause the tooth to be released permitting the chain to be moved to the next tooth, at which time the said lever 20 is again brought to the position illustrated, clamping the chain tightly between the bars 14 and 15 as above described.

Due to the fixed angle that the grinding wheel can be maintained in relation to the saw, a completely uniform angle can be maintained to the cutting edge of the teeth, carrying out one of the primary objects of our invention, and, further, due to the accuracy of the gauge pins 45 the depth of grinding can be made accurately, thereby maintaining uniformity of teeth, which is another object of our invention, and the teeth can be hollow ground and the shape of the teeth can be accurately maintained.

We will now describe the method of gauging the rider clearance of the rider teeth 52. The head 46 of the one or other pin 45 is brought to the position illustrated in Figure 7 wherein it engages the top side of the cutting teeth. The rider teeth 52 can then be brought under the head 46 of the gauge pin and the clearance 53 can be measured. If this clearance is not sufficient it can be increased the desired amount as indicated in Figure 8 by adjusting the holders 44 vertically, wherein the grinder wheel 37 rests upon the rider tooth 52, then the stop 54 for limiting the depth of the cut is adjusted by a clearance gauge indicated by the broken lines 55, so that it will permit the grinding wheel 37 to cut away the proper amount from the rider tooth 52. From the first trial run tooth all of the other rider teeth will be ground accurately, which carries out a further object of our invention, and a still further object of the invention providing accurate riding clearance insuring a smooth operating saw.

Also, due to the pivotal mounting of the grinder with its grinding wheel 37, by the motor 36 held in clamp 38 pivoted at 39 on supporting bracket 40, in conjunction with the angular adjustments in a plurality of angles, directions or planes thereon and on the universal joint 41—42 and at the universal brackets 8 and 9, the motor of the grinder can be swung over rearwardly or out of the way toward the rear to rest upon stop 50 when not in use, or forwardly for use, at any desired angular position, such as at an oblique angle toward but not passing the tooth or through the same, but only coming against the same, as shown in Figures 5, 6 and 8, limited by engagement with stop 54, which when once set or adjusted insures that all of the teeth of the chain saw will be ground to the same uniform depth to increase the cutting efficiency and smoothness of operation of the saw. Moreover, the grinding wheel may be readily set to grind the teeth of standard cutter chains which are becoming obsolete, but, also, to hollow grind the teeth of the "Oregon" or chisel bit or other types of chain saws and teeth which require hollow grinding by reason of being undercut or beveled underneath at their turned over or rounded cutting edges and are sharpened on the underside or inside and bight portions thereof. In addition, by accurately grinding the rider teeth, accurate riding clearance will be provided by reason of the gauging and measuring of the clearance, to insure uniform clearance throughout the length of the chain saw to enhance smooth and efficient cutting in operation.

What we claim is:

1. A chain saw grinding apparatus comprising a support, an elongated clamp for securing a length of chain saw, means mounting said clamp on said support, an arm mounted substantially parallel to said clamp and extending beyond one end of said clamp, a bracket adjustably mounted on said arm, an idler journalled on said bracket for supporting the chain saw beyond the clamp, a power grinder, means mounting said grinder on said support for movement to and from operative position adjacent said clamp support members mounted in spaced relation adjacent said clamp, a pin removably carried by one of said members and projecting over said clamp to form an abutment for the rear edge of a saw tooth to position the tooth in relation to the grinder, and a gauge pin carried by the other of said members and projecting over said clamp to overlie the saw teeth for determining the relative height of the cutting teeth and the rider teeth of the saw.

2. A chain saw grinding apparatus comprising a support, an elongated clamp for securing a length of chain saw, means mounting said clamp on said support, an arm mounted substantially parallel to said clamp and extending beyond one end of said clamp, a bracket adjustably mounted on said arm, an idler journalled on said bracket for supporting the chain saw beyond the clamp, a power grinder, means mounting said grinder on said support for movement to and from operative position adjacent said clamp, said grinder mounting means comprising an arm pivotally supported at one end by said clamp mounting means, a bracket, a universal joint between the free end of said arm and said bracket, a pivotal connection between said bracket and said grinder, and an adjustable stop on said bracket for limiting the movement of said grinder about said pivotal connection toward the saw in said clamp.

3. A chain saw grinding apparatus comprising a vertical support, a bracket vertically adjustable on the support, an elongated clamp for securing a length of a chain saw comprising links having spaced cutter and rider teeth, means for mounting said clamp across said bracket for adjustable angular movements in vertical and horizontal planes, means carried by said bracket and cooperating with said clamp for supporting a chain saw for lengthwise movement thereon for clamping the saw at different teeth thereof, an arm also carried by the bracket for horizontal swinging movement, a bracket having an adjustable universal joint mounting on said arm to turn and adapted to be held in adjusted position in a plurality of angular positions, a power grinder pivoted on the bracket for movement toward and away from the clamp and teeth in different angular positions relative to said teeth, and means to limit the pivotal movements of the grinder.

4. An apparatus as defined in claim 3, wherein said last-named means is adjustable and supports the grinder in positions toward and away from the clamp and teeth, and adjustable stop means on the clamp mounting means for positioning the teeth in grinding position and gauging the clearance of the teeth at the top for grinding the same with uniform projection.

JOHN ALBERT TOY.
PAUL RETHORET.

REFERENCES CITED

The following references are of record in the file of this patent:

UNITED STATES PATENTS

| Number | Name | Date |
|---|---|---|
| 105,543 | Borthwick | July 19, 1870 |
| 107,270 | Mallory | Sept. 13, 1870 |
| 142,173 | Olney | Aug. 26, 1873 |
| 261,624 | Olney | July 25, 1882 |
| 1,084,824 | Shaules et al. | Jan. 20, 1914 |
| 1,812,452 | Shaw | June 30, 1931 |
| 2,217,145 | Stihl | Oct. 8, 1940 |
| 2,318,456 | Blum | May 4, 1943 |
| 2,347,087 | Deyarmond | Apr. 18, 1944 |
| 2,405,365 | Myers | Aug. 6, 1946 |
| 2,410,828 | Lofstrand | Nov. 12, 1946 |
| 2,413,919 | Hoffsmith | Jan. 7, 1947 |
| 2,459,233 | Mall | Jan. 18, 1949 |
| 2,507,371 | Eklund | May 9, 1950 |
| 2,556,794 | Campbell | June 12, 1951 |